United States Patent
Chen et al.

(10) Patent No.: US 10,110,058 B2
(45) Date of Patent: Oct. 23, 2018

(54) POWER CONVERSION DEVICE AND METHOD FOR PREVENTING ABNORMAL SHUTDOWN THEREOF

(71) Applicant: Chicony Power Technology Co., Ltd., New Taipei (TW)

(72) Inventors: Ti-Te Chen, New Taipei (TW); Chao-Yi Huang, New Taipei (TW); Kuo-Cheng Chen, New Taipei (TW)

(73) Assignee: CHICONY POWER TECHNOLOGY CO., LTD., New Taipei (TW)

( * ) Notice: Subject to any disclaimer, the term of this patent is extended or adjusted under 35 U.S.C. 154(b) by 191 days.

(21) Appl. No.: 15/163,052

(22) Filed: May 24, 2016

(65) Prior Publication Data

US 2017/0346335 A1    Nov. 30, 2017

(51) Int. Cl.

| | |
|---|---|
| *H02J 7/00* | (2006.01) |
| *H02J 9/00* | (2006.01) |
| *H02J 9/06* | (2006.01) |
| *H02M 3/28* | (2006.01) |
| *H02M 1/00* | (2006.01) |

(52) U.S. Cl.
CPC ............... *H02J 9/061* (2013.01); *H02M 3/28* (2013.01); *H02M 3/285* (2013.01); *H02M 2001/0006* (2013.01); *H02M 2001/0032* (2013.01)

(58) Field of Classification Search
CPC .. H02J 9/061; H02M 3/24; H02M 2001/0032; H02M 1/42
See application file for complete search history.

(56) References Cited

U.S. PATENT DOCUMENTS

| | | | | |
|---|---|---|---|---|
| 5,526,253 | A * | 6/1996 | Duley | H02M 3/07 363/59 |
| 5,790,391 | A * | 8/1998 | Stich | H02J 9/062 307/64 |
| 6,574,081 | B1 * | 6/2003 | Matsumoto | H02H 7/1213 323/276 |

(Continued)

FOREIGN PATENT DOCUMENTS

| | | |
|---|---|---|
| TW | 201414156 A | 4/2014 |
| TW | I505603 B | 10/2015 |

(Continued)

*Primary Examiner* — Alfonso Perez Borroto
*Assistant Examiner* — Esayas Yeshaw
(74) *Attorney, Agent, or Firm* — Muncy, Geissler, Olds & Lowe, P.C.

(57) ABSTRACT

A power conversion device and a method for preventing abnormal shutdown thereof are provided. The method includes: providing a power conversion device including a main power supply and a standby power supply electrically connected to the main power supply. The standby power supply is configured to provide an operational voltage for microcontrollers of the main power supply; performing a monitoring procedure for monitoring the operational voltage when the power conversion device entering a non-standby mode and the standby power supply is inactivated; and forcing the standby power supply to activate before the operational voltage is lower than a preset compensation voltage, such that an abnormal shutdown condition of the power conversion device while the operational power is equal to or lower than the preset compensating voltage is prevented.

9 Claims, 3 Drawing Sheets

(56) References Cited

U.S. PATENT DOCUMENTS

| | | | | |
|---|---|---|---|---|
| 8,026,703 B1* | 9/2011 | Damaraju | ............... | G05F 1/575 |
| | | | | 323/275 |
| 2007/0279024 A1* | 12/2007 | Falvey | ................. | H02M 3/158 |
| | | | | 323/280 |
| 2009/0140709 A1* | 6/2009 | Dong | ..................... | G05F 1/573 |
| | | | | 323/283 |
| 2012/0159202 A1* | 6/2012 | Xu | ............................ | G06F 1/26 |
| | | | | 713/300 |
| 2012/0262950 A1* | 10/2012 | Nate | ...................... | H02J 9/005 |
| | | | | 363/16 |
| 2012/0286577 A1* | 11/2012 | Yang | ................... | H01H 71/123 |
| | | | | 307/72 |
| 2013/0215648 A1* | 8/2013 | Sasaki | ............... | H02M 3/33538 |
| | | | | 363/21.04 |
| 2015/0089253 A1* | 3/2015 | Doering | ................... | G06F 1/26 |
| | | | | 713/300 |
| 2015/0200567 A1* | 7/2015 | Huang | ................... | H02J 9/061 |
| | | | | 307/64 |
| 2015/0270744 A1* | 9/2015 | Lacarnoy | ............... | H02J 9/061 |
| | | | | 307/66 |

FOREIGN PATENT DOCUMENTS

| | | |
|---|---|---|
| TW | I513159 B | 12/2015 |
| TW | 201605151 A | 2/2016 |

\* cited by examiner

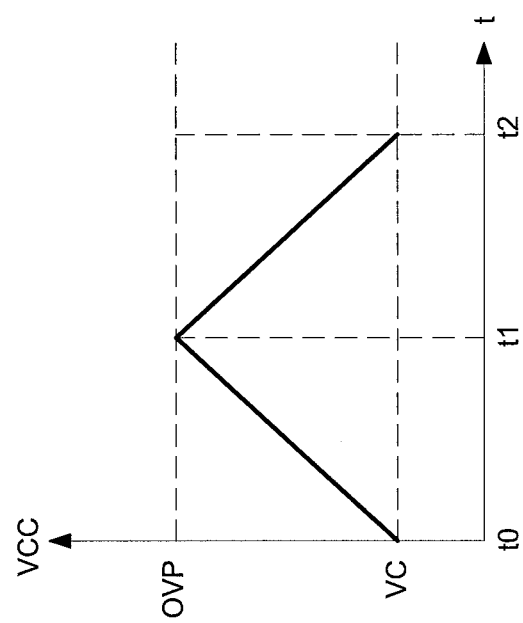

POWER CONVERSION DEVICE AND METHOD FOR PREVENTING ABNORMAL SHUTDOWN THEREOF

BACKGROUND

Technical Field

The present disclosure relates to power controlling technique. More particularly, the present disclosure relates to a method for preventing a power conversion device from abnormal shutdown when it transits from a standby mode to a non-standby mode operation.

Description of Related Art

In general, electronic devices are operated when providing with a suitable and normal electric power, thereby the electronic devices may be suffered when the electric power applies abnormally. A power conversion device is usually arranged between an alternative current (AC) electric power and the electronic device, and is configured to detect the electric power required by the electronic device and convert the AC electric power to direct current (DC) electric power required by the electronic device to power the electronic device. The electronic device can be operated under a low power consumption mode or a high power consumption mode, and when the electronic device is operated under the low power consumption mode, the electric power required by the electronic device reduces, thus the electric power provided by the power conversion device for powering the electric device is then reduced to meet the requirement of the electronic device. Specifically, the power conversion device may include two power supplies common grounded, one of the power supplies is configured to provide the electric power when the electronic device is operated under the high power consumption mode, and the other power supply is configured to provide the electric power when the electronic device is operated under the low power consumption mode. However, an abnormal shutdown may occur when the electronic device transits from the low power consumption mode to the high power consumption mode since the power supplied are common grounded.

SUMMARY

According to one aspect of the present disclosure, a method for preventing abnormal shutdown is adapted for a power conversion device. In particular, in the method, a power conversion device including a main power supply and a standby power supply are provided, the standby power supply is electrically connected to the main power supply and configured to provide an operational voltage for microcontrollers of the main power supply. In addition, a monitoring procedure is performed for monitoring the operation voltage during the power conversion device enters a non-standby mode and the standby power supply is inactivated. Furthermore, the standby power supply is forced to activate before the operation voltage is lower than a preset compensation voltage, such that an abnormal shutdown condition of the power conversion device while the operational power is equal to or lower than the preset compensating voltage is prevented.

According to another aspect of the present disclosure, a power conversion device includes a main power supply and a standby power supply. The main power supply includes a plurality of microcontrollers. The standby power supply is configured to provide an operation voltage for the microcontrollers; the standby power supply module includes an operation voltage supply unit, a standby power controller, and a voltage regulator, the operation voltage supply unit is electrically connected to the standby power controller, and the voltage regulator is electrically connected to the standby power controller and the microcontrollers. The standby power controller forces the standby power supply to activate before the operation voltage is lower than a lowest compensation voltage to prevent the power conversion device from abnormal shutdown.

BRIEF DESCRIPTION OF DRAWING

The present disclosure can be more fully understood by reading the following detailed description of the embodiment, with reference made to the accompanying drawings as follows:

FIG. 3 is a timing chart indicating an operation voltage provided by an operation voltage supply unit shown in FIG. 2.

DETAILED DESCRIPTION

Figure 1:
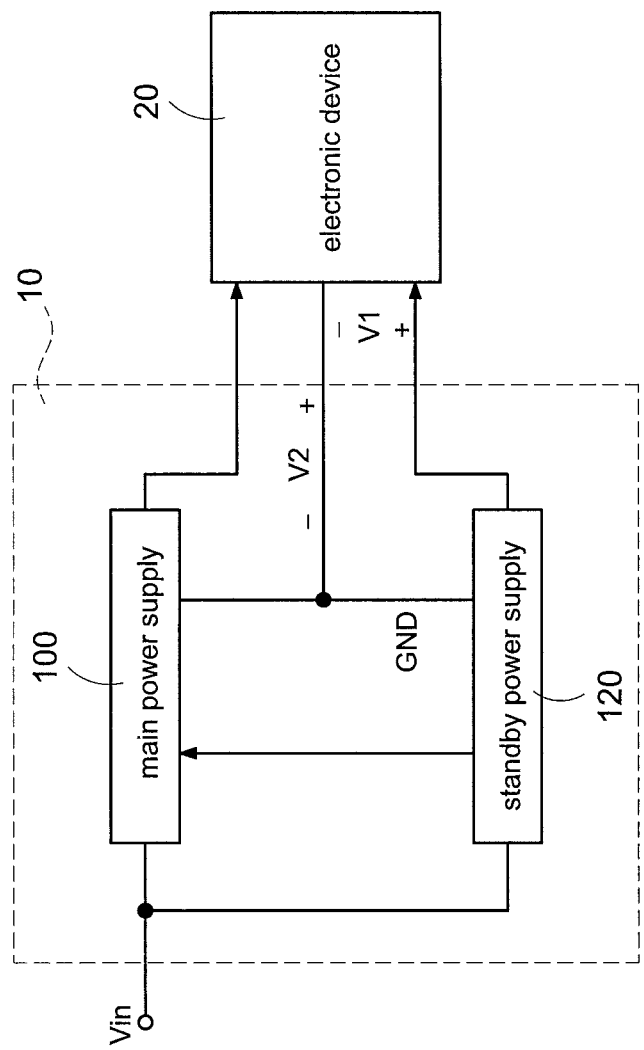
FIG. 1 is a circuit block diagram of a power conversion device according to the present disclosure.

Reference is made to FIG. 1, which is a circuit block diagram of a power conversion device according to the present disclosure. The power conversion device 10 includes an input terminal for connecting to a power source Vin and an output terminal for connecting to an electronic device 20. The power conversion device 10 receives an electric power (such as an alternative current (AC) electric power) provided by the power source Vin and then provides a direct current (DC) electric powers suitable to the capacity required for the electronic device 20 to power the electronic device 20. The electronic device 20 is, for example, a personal computer (PC) or a server. The power conversion device 10 is provided to be operated in a standby mode and a non-standby mode in accordance with load currents. When the electronic device 20 is operated in a no-load condition or a light load condition (hereafter "the low power consumption mode"), the power conversion device 10 is operated in the standby mode; on the contrary, when the electronic device 20 is operated in a normal load condition or a heavy load condition (hereafter "the high power consumption mode"), the power conversion device 10 is operated in the non-standby mode operation. In general, the (load) currents required for the electronic device 20 operated in the high power consumption mode is higher than that of in the low power consumption mode.

The power conversion device 10 further includes a main power supply 100 and a standby power supply 20, the main power supply 100 is electrically connected to the power source Vin and the electronic device 20, and the standby power supply 120 is electrically connected to the power source Vin, the electronic device 20, and the main power supply 100. During the standby mode operation, the electric powers required for the electronic device 20 are provided by the standby power supply 120; during the non-standby mode operation, the electric powers required for the electronic device 20 are provided by the standby power supply 120 and the main power supply 100. In addition, an operation voltage required for the microcontrollers 102 (as shown in FIG. 2) of the main power supply 100 during the standby mode operation and the non-standby mode operation are provided by the standby power supply 120.

Figure 2:
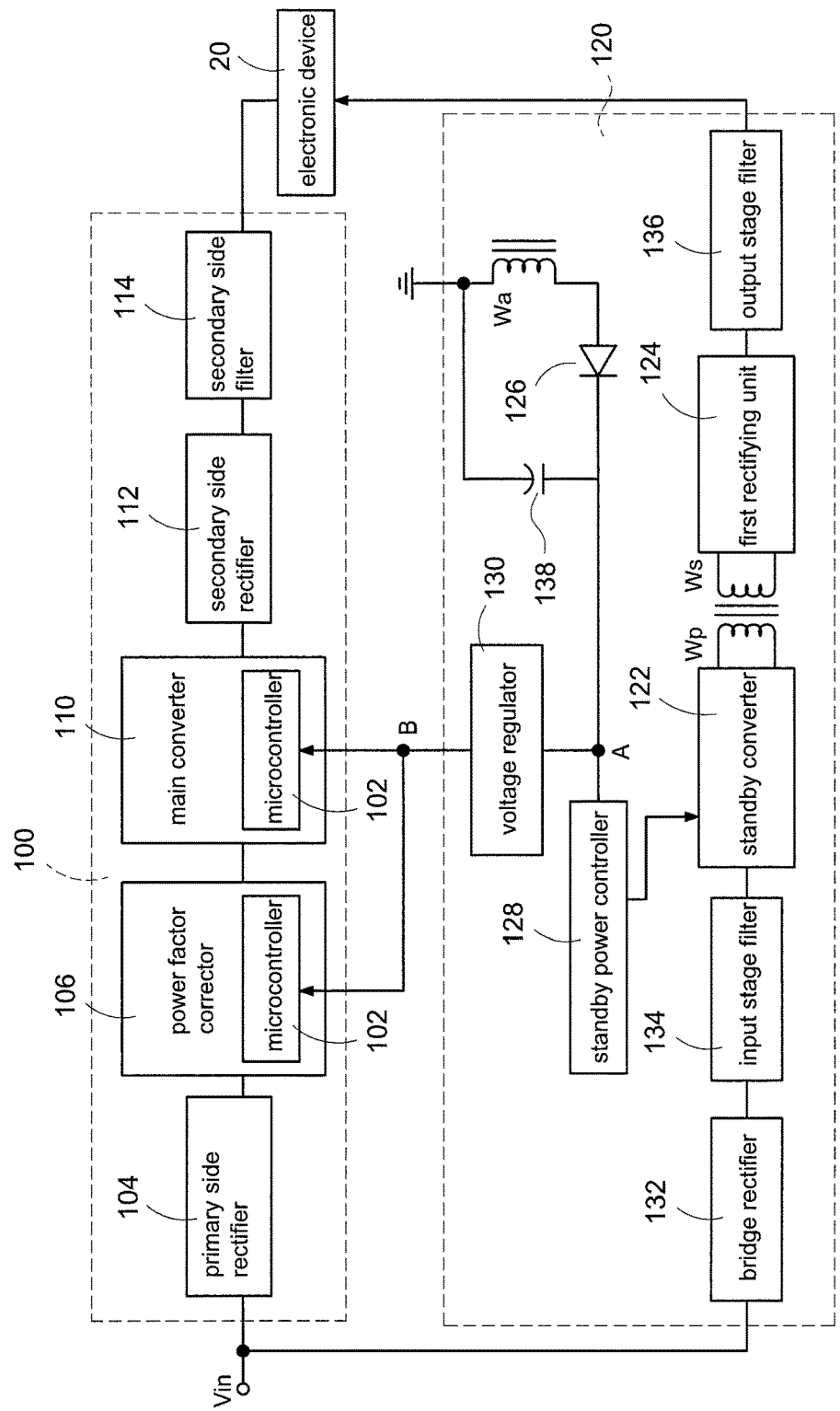
FIG. 2 is another circuit block diagram of the power conversion device according to the present disclosure.

Reference is made to FIG. 2, the main power supply 100 includes a primary side rectifier 104, a power factor corrector 106, a main converter 110, a secondary side rectifier 112, and a secondary side filter 114. The primary side rectifier 104 is electrically connected to the power source Vin, and the power source Vin is, for example, a commercial power source for providing the AC electric power. The power factor corrector 106 is arranged between the primary side rectifier 104 and the main converter 110 and electrically connected thereto. The secondary side rectifier 112 is arranged between the main converter 110 and the secondary side filter 114 and electrically connected thereto. The secondary side filter 114 is further electrically connected to the electronic device 20.

The primary side rectifier 104 is, for example, a bridge rectifier, and the second rectifier 114 is, for example, a synchronous rectifier. During the non-standby mode operation, the primary side rectifier 104 rectifies the AC electric power to a full-wave rectified power without power factor correction. The power factor corrector 106 receives the full-wave rectified power without power factor correction and ensures that the input current of the rectified power without power factor correction follows voltage of the rectified power without power factor correction in time and amplitude proportionally (i.e. the input voltage and current of the rectified power are maintained in phase relative to each other). The rectified power with power factor correction is conducted to the main converter 110, and a converted power of a different level is then produced. The secondary side rectifier 112 rectifies the converted power into a pulsating DC electric power, and the secondary side filter 114 filters the ripple of the pulsating DC electric power and then sent a stable DC electric power to the electronic device 20 to meet the requirements thereof.

In FIG. 2, the microcontrollers 102 are, for example, arranged within the power factor corrector 106 and the main converter 110, and configured to control operations (such as turn-on and turn-off) of power switches or active components within the power factor corrector 106 and the main converter 110 according to the DC electric power required for the electronic device 20.

For example, when the electronic device 20 is operated under the high power consumption mode, the main power supply 10 provides the DC electric power to power and drive the electronic device 20, thus the microcontroller 102 of the power factor corrector 106 drives the power factor corrector 106 to perform the power factor correcting procedure, and the microcontroller 102 of the main converter 110 drives the main converter 110 to perform a power conversion procedure to provide the converted power suitable the capacity required for the electronic device 20. On the contrary, when the electronic device 20 is operated under the low power consumption mode, the standby power supply 120 provides the DC electric power to the electronic device 20 to make sure that the electronic device 20 is activated or not (i.e. the DC electric power provided by the standby power supply 120 is used for detecting whether the electronic device 20 transits from the low power consumption mode to the high power consumption mode or not). Thus the operation voltage required for the microcontrollers 102 of the power factor corrector 106 and the main converter 110 is reduced for lowering power consumption. It should be noted that the level of the operation voltage required for the microcontrollers 102 may be modulated by the duty cycle of the controlling signal sent from a standby power converter 128 to the standby converter 122.

With referring again to FIG. 2, the standby power supply 120 includes the standby conversion unit (its reference numeral is omitted), a first rectifying unit 124, a rectifying switch 126, the standby power controller 128, a primary winging Wp, a secondary winding Ws, and an auxiliary winding Wa. The secondary winding Ws and the auxiliary winding Wa are magnetically coupled to the primary winding Wp. The turn ratio of the primary winding Wp and the secondary ratio Ws is designated for determining how much electric power (such as voltage and/or current) can be produced during the standby mode, and the turn ratio of the primary winding Wp and the auxiliary winding Wa is designated for determining how much operation voltage can be provided to the microcontrollers 102.

The standby power supply 120 further includes a bridge rectifier 132, an input stage filter 134, and an output stage filter 136. The bridge rectifier 132 and the input stage filter 134 are arranged between the power source Vin and the standby converter 122 and electrically connected thereto, and the output stage filter 136 is arranged between the first rectifying unit 124 and the electronic device 20 and electrically connected thereto.

The bridge rectifier 132 receives the AC electric power provided by the power source Vin and rectifies the AC electric power to a full-wave rectified power. The input stage filter 134 filters the noise within the rectifier power from the bridge rectifier 132 and conducts the filtered power to the standby converter 122 and the primary winding Wp. The first rectifying unit 124 rectifies the electric power outputted from the secondary winding Ws into a pulsating DC power, and the output stage filter 136 filters the ripple of the pulsating DC electric power and then sent a stable DC electric power to the electronic device 20 to meet the requirements thereof. In addition, the rectifying switch 126 rectifies the electric power outputted from the auxiliary winding Wa into a pulsating DC power, and the pulsating DC power is conducted to the standby power controller 128.

The voltage regulator 130 is electrically connected to the microcontrollers 102 and the standby power controller 128, and is configured to monitor operations of the standby converter 122 and force the standby converter 122 to activate in a specific condition. The primary winding Wp, the auxiliary winding Wa, the rectifying switch 126, and the DC capacitor 138 collectively form an operation voltage supplying unit (its reference numeral is omitted).

In general, the output stages (or called the secondary sides) of the main power supply 100 and the standby power supply 120 of the power conversion device 10 are common-grounded (as can be shown in FIG. 1, the main power supply 100 and the standby power supply 120 are electrically connected to the ground GND). Therefore, the standby power supply 120 may shutdown when the electronic device 20 transits from the low power consumption mode to the high power consumption mode and the current required for the electronic device 20 is increased.

Specifically, when the electronic device 20 transits from the low power consumption mode to the high power consumption mode, the power conversion device 10 enters the non-standby mode, and the main power supply 100 wakes up from the standby mode and provides the electric power required for the electronic device 20 to power the electronic device 20. This gives the operation voltage required for the microcontrollers 102 to be increased for increasing the electric power provided by the main power supply 100.

Since the output stages of the main power supply 100 and the standby power supply 120 are common-grounded, the standby power supply 120 not only provides the standby power (as V1 shown in FIG. 1) originally required for the electronic device 20 but also a loop voltage (as V2 shown in FIG. 1), which is generated in the output circuit loop of the standby power supply 120 by the output current of the main power supply 100.

When a total voltage provided by the standby power supply is VSB, the standby voltage provided by the standby power supply 120 to the electronic device 20 is V1, and the loop voltage generated in output stage of the standby power supply 120 by the output current of the main power supply 100 is V2, the following condition is satisfied:

$$VSB=V1+V2.$$

When the total voltage (VSB) provided by the standby power supply 120 is higher than a predetermined maximum voltage, the standby converter 122 is inactivated, and the operation voltage of the microcontrollers 102 during the non-standby mode is provided by the DC capacitor 138. In addition, when the DC voltage provided by the DC capacitor 138 drops below a predefined under-voltage lockout (UVLO) voltage, the power conversion device 10 is deliberately shut down.

Specifically, each microcontroller 102 provided with a predefined UVLO voltage, and the microcontroller 102 is inactivated when the operation voltage provided to the microcontroller 102 drops below the predefined UVLO voltage. In addition, the predefined UVLO voltages of the microcontrollers 102 may be different. When the voltage provided from the operation voltage supplying unit to the standby power controller 128 is VA (the voltage of node A shown in FIG. 2), the operation voltage required for the microcontrollers 102 of the main power supply 100 during the non-standby mode operation is VB (the voltage of node B shown in FIG. 2), and the lowest compensating voltage is VC, and a maximum UVLO voltage among the UVLO voltages of the microcontrollers 102 is UVLO(max), the following condition is satisfied:

$$VC=VA-(VB-UVLO(\max)).$$

In order to prevent the power conversion device 10 from abnormal shutdown, when it transits from the standby mode to the non-standby mode, the standby power controller 128 of the present disclosure performs a monitoring procedure for monitoring the operation voltage provided by the operating voltage supplying unit when the power conversion device 10 transmits from the standby mode to the non-standby mode and the standby converter 122 is inactivated. The standby power controller 128 further forces the standby converter 122 to activate before the DC voltage provided by the DC capacitor 138 is lower than the lowest compensating voltage (VC). When the standby converter 122 is activated, the filtered electric power entered the standby converter 122 is coupled from the primary winding Wp to the auxiliary winding Wa, the rectifying switch 126 rectifies the electric power outputted from the auxiliary winding Ws into the pulsating DC power and provides the DC power to the microcontrollers 102. Meanwhile, the DC capacitor 138 is charged, and the operation voltage (VCC) provided by the operation voltage supplying unit is increased (as time points between t0 and t1 shown in FIG. 3).

When the DC voltage provided by the operation voltage supply unit is equal to a sun of the lowest compensating voltage and a predetermined voltage, the standby power controller 128 stops performing the monitoring procedure.

To sum up, the power conversion device 10 of the present disclosure provides the ability to prevent it from abnormal shutdown when it transits from the standby mode to the non-standby mode. The method includes the steps of:

Step 1. The power conversion device 10 includes a main power supply 100 and the standby power supply 120 is provided. The main power supply 100 is configured to provide the electric power to power the electronic device 20 during the non-standby mode. The standby power supply is electrically connected to the main power supply 100 and is configured to provide electric power to the electronic device 20 during the standby mode. The standby power supply further provides the operation voltage required for the microcontrollers 102 of the main power supply 100 during the standby mode and the non-standby mode.

Step 2. A monitoring procedure is performed when the power conversion device 10 transits from the standby mode to the non-standby mode and the standby converter 122 is inactivated.

Step 3. The standby converter 122 of the standby power supply 120 is forced to activate before the operation voltage is lower than the lowest compensation voltage to prevent the power conversion device 10 from abnormal shutdown.

Step 4. The monitoring procedure is stopped performing when the operation voltage is higher than the lowest compensating voltage by the predetermined value.

The power conversion device 10 may further include an over-voltage protecting circuit (not shown). The over-voltage protecting circuit is configured to prevent the standby power controller 128 from abnormal shutdown when the operation voltage is equal to or higher than a predetermined maximum protecting voltage (OVP, as time point t2 shown in FIG. 3). Specifically, when the operation voltage is equal to or higher than the predetermined maximum protecting voltage, the standby converter 122 is inactivated to lower the electric power provided therefrom (as time point between t1 and t2 shown in FIG. 3) to prevent the power conversion device 10 from abnormally shutdown.

Although the present disclosure has been described with reference to the foregoing preferred embodiment, it will be understood that the disclosure is not limited to the details thereof. Various equivalent variations and modifications can still occur to those skilled in this art in view of the teachings of the present disclosure. Thus, all such variations and equivalent modifications are also embraced within the scope of the disclosure as defined in the appended claims.

What is claimed is:

1. A method for preventing abnormal shutdown of a power conversion device comprising:
   providing the power conversion device comprising a main power supply and a standby power supply, wherein the standby power supply is electrically connected to the main power supply and provides an operation voltage for a plurality of microcontrollers of the main power supply;
   performing a monitoring procedure for monitoring the operation voltage during the power conversion device transits from a standby mode to a non-standby mode and the standby power supply being inactivated; and
   forcing the standby power supply to activate before the operation voltage is lower than a lowest compensation voltage to prevent the power conversion device from abnormal shutdown.

2. The method of claim 1, further comprising:
   stopping performing the monitoring procedure after the operation voltage being equal to a sum of the lowest compensating voltage and a predetermined voltage.

3. The method of claim 2, wherein when a voltage provided by the standby power supply is VA, the operation voltage required for the microcontrollers during the non-standby mode is VB, the lowest compensating voltage is VC, and a maximum under-voltage lockout voltage is UVLO(max), the following condition is satisfied:

$$VC=VA-(VB-UVLO(\text{max})).$$

4. The method of claim 1, wherein the operation voltage of the microcontrollers during a standby mode is lower than that of during the non-standby mode.

5. A power conversion device comprising:
   a main power supply comprising a plurality of microcontrollers; and
   a standby power supply configured to provide an operation voltage for the microcontrollers, wherein the standby power supply module comprises an operation voltage supply unit, a standby power controller, and a voltage regulator, the operation voltage supply unit is electrically connected to the standby power controller, and the voltage regulator is electrically connected to the standby power controller and the microcontrollers;
   wherein when the power conversion device transits from a standby mode to a non-standby more and the standby power supply is activated, the standby power controller monitors an operation voltage provided by the operation voltage supply unit and forces the standby power supply to activate before the operation voltage is lower than a lowest compensation voltage to prevent the power conversion device from abnormal shutdown.

6. The power conversion device of claim 5, wherein when a voltage provided by the operation voltage supply unit is VA, the operation voltage required for the microcontrollers during the non-standby mode is VB, the lowest compensation voltage is VC, and a maximum under-voltage lockout voltage is UVLO(max), the following condition is satisfied:

$$VC=VA-(VB-UVLO(\text{max})).$$

7. The power conversion device of claim 5, wherein the operation voltage supply unit comprises:
   a standby convertor comprising a primary winding and an auxiliary winding magnetically coupled to the primary winding;
   a rectifying switch electrically connected to the auxiliary winding, the standby power controller, and the voltage regulator; and
   a direct current (DC) capacitor electrically connected to the auxiliary winding, the standby power controller, and the voltage regulator, wherein when the standby converter is activated by the standby power controller, the operation voltage is transmitted to the microcontrollers through the primary winding, the auxiliary winding, the rectifying switch, and the voltage regulator, when the standby power converter is inactivated, the operation voltage transmitted to the microcontrollers through the voltage regulator is provided by the DC capacitor.

8. The power conversion device of claim 5, wherein the microcontrollers are arranged in a main converter and a power factor corrector of the main power supply, and the power factor corrector is electrically connected to the main converter.

9. The power conversion device of claim 5, wherein when voltage regulator monitors the operation voltage when the standby converter is inactivated, and the voltage regulator stops monitoring the operation voltage when the operation voltage is equal to or higher than a sum of the lowest compensating voltage and a predetermined voltage.

* * * * *